Figure 1:
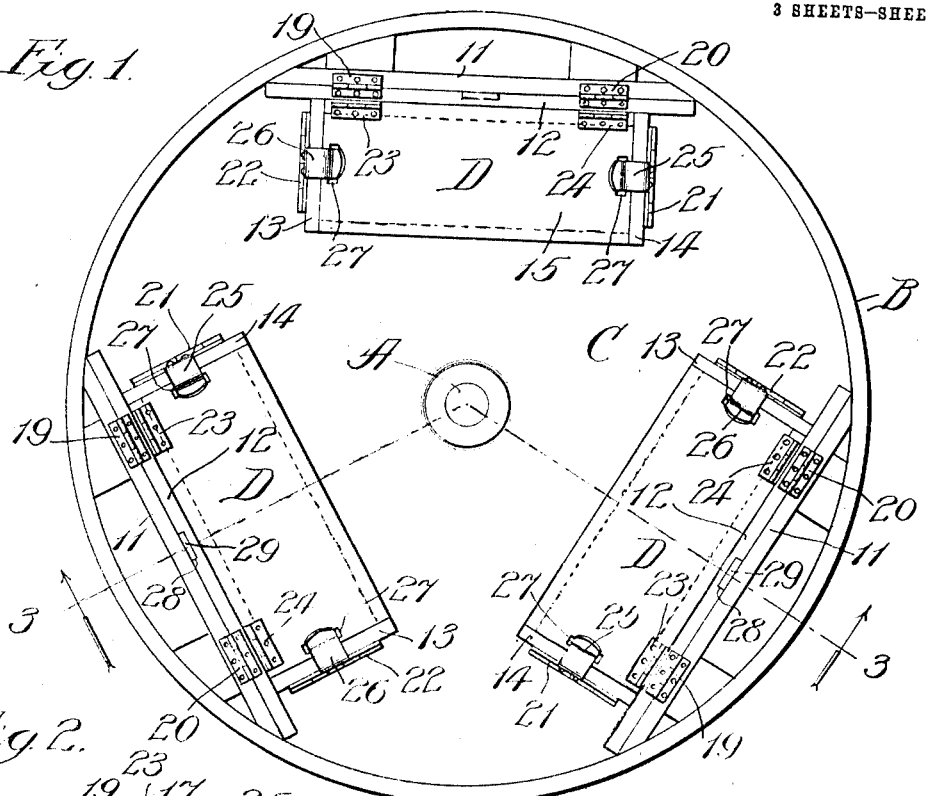

N. P. ANNIS.
CENTRIFUGAL BLOCK MACHINE.
APPLICATION FILED JUNE 26, 1909.

1,073,584.

Patented Sept. 23, 1913.

3 SHEETS—SHEET 1.

Witnesses:
John Enders
Chas. H. Buell

Inventor
N. P. Annis
By L. B. Copeland
Atty.

N. P. ANNIS.
CENTRIFUGAL BLOCK MACHINE.
APPLICATION FILED JUNE 26, 1909.

1,073,584.

Patented Sept. 23, 1913.

3 SHEETS—SHEET 2.

Witnesses:
John Enders
Chas. H. Bull

Inventor
N. P. Annis.
By L. B. Coupland
Atty.

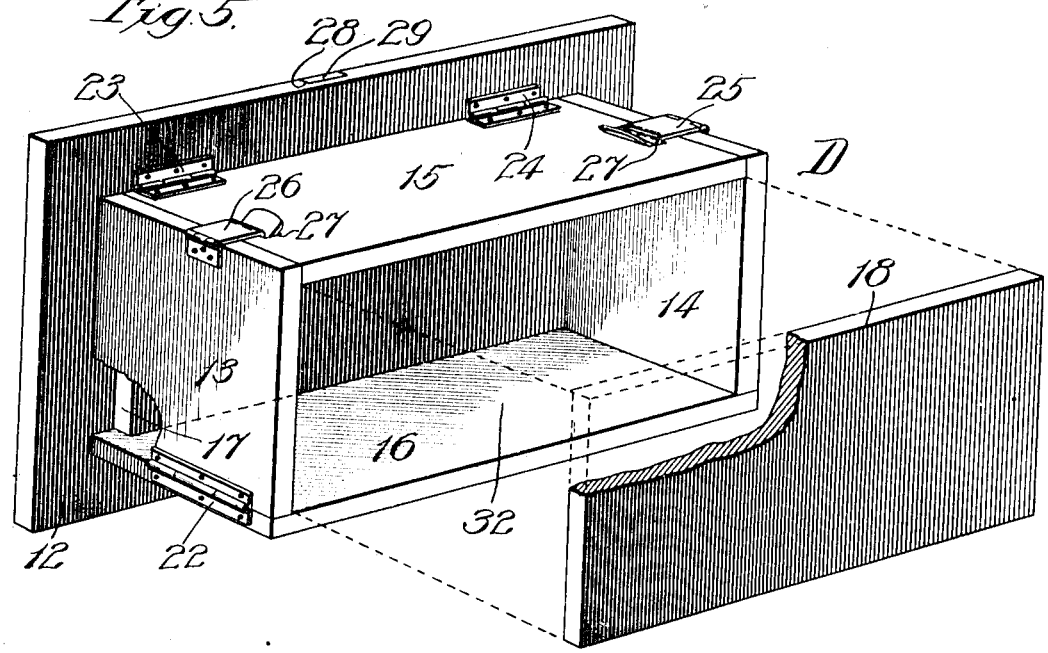
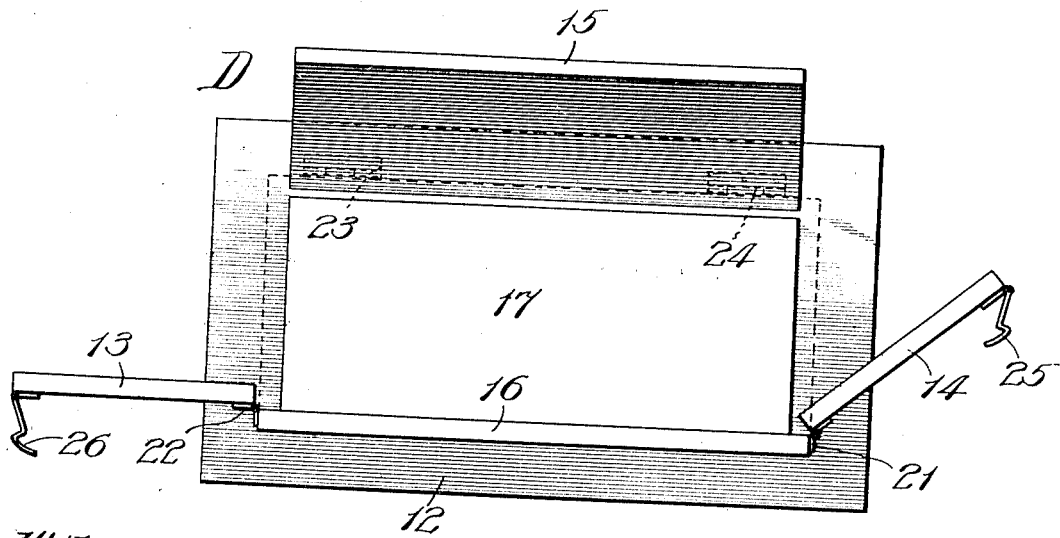

UNITED STATES PATENT OFFICE.

NATHANIEL P. ANNIS, OF CHICAGO, ILLINOIS.

CENTRIFUGAL BLOCK-MACHINE.

1,073,584.

Specification of Letters Patent.  Patented Sept. 23, 1913.

Application filed June 26, 1909. Serial No. 504,568.

*To all whom it may concern:*

Be it known that I, NATHANIEL P. ANNIS, a citizen of the United States, residing at Chicago, in the county of Cook and State of Illinois, have invented certain new and useful Improvements in Centrifugal Block-Machines, of which the following is a specification.

This invention relates to improvements in the art of molding plastic material and more especially, to the manufacture of concrete blocks, brick and the like, and has for its primary object to provide an improved method of molding or compressing the material into commercial form, by centrifugal force.

A further object is to provide improved means for subjecting the molds containing the plastic composition to a rapid bodily rotary motion, whereby the centrifugal force developed, will thoroughly compress and solidify the substance within the molds.

A further object is to provide a mold composed of a number of sections which are adapted to be closed up and opened out in the operation of practical working.

To the attainment of these ends and the accomplishment of other new and useful objects as will appear, the invention consists in the features of novelty hereinafter more fully described and set forth in the appended claims.

In the preparation of the material from concrete, cement, earth and the like, a proportion of water is used in the composition to bring the mixture into a proper plastic or semi-fluid condition, to form a homogeneous mass when molded into the desired form. Under the ordinary method of molding concrete blocks, if an excess of water has been used, it will not be evenly expressed and the product will not be a homogeneous body. If too little of the liquid element is used in the process of mixing, the cohesion of the particles will not be complete in the molded form and a considerable percentage of the product will be lost by disintegration in the operation of handling and curing.

Practical working has demonstrated that centrifugal force, when applied through a practical working machine, will effect a much better result than is possible under the ordinary arrangements, no matter whether the liquid element of the composition is in excess or otherwise. However, it is safe to have the liquid element in excess and the composition thoroughly saturated, as the superfluous proportion will be readily expelled and the remaining portion made to more evenly permeate the mass from center to surface. The unit particles are also more evenly and uniformly compressed and packed into a solid by centrifugal force. It is also possible to regulate the exact period of time that the product shall be subjected to centrifugal action in securing the best results, both as to the degree of condensation and coherence and the amount of moisture to be retained.

Figure 2:
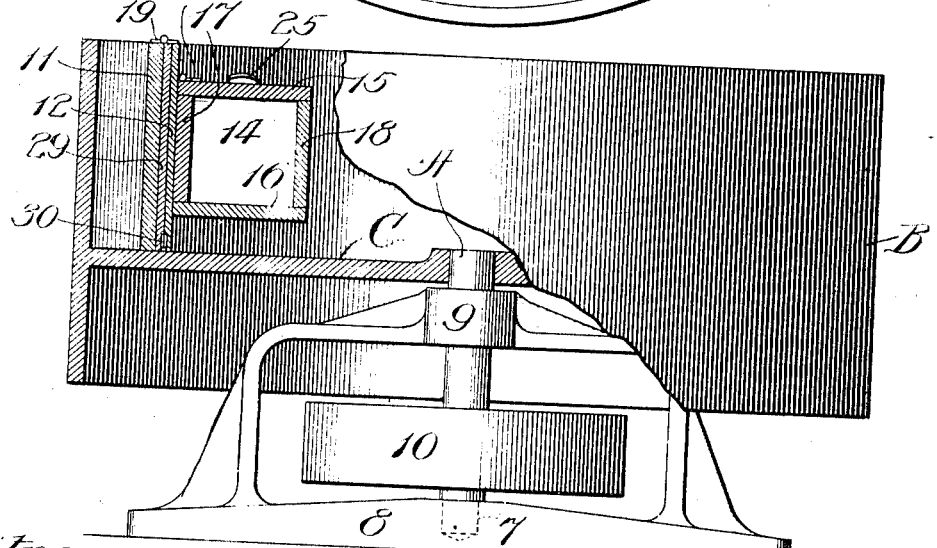
Figure 3:
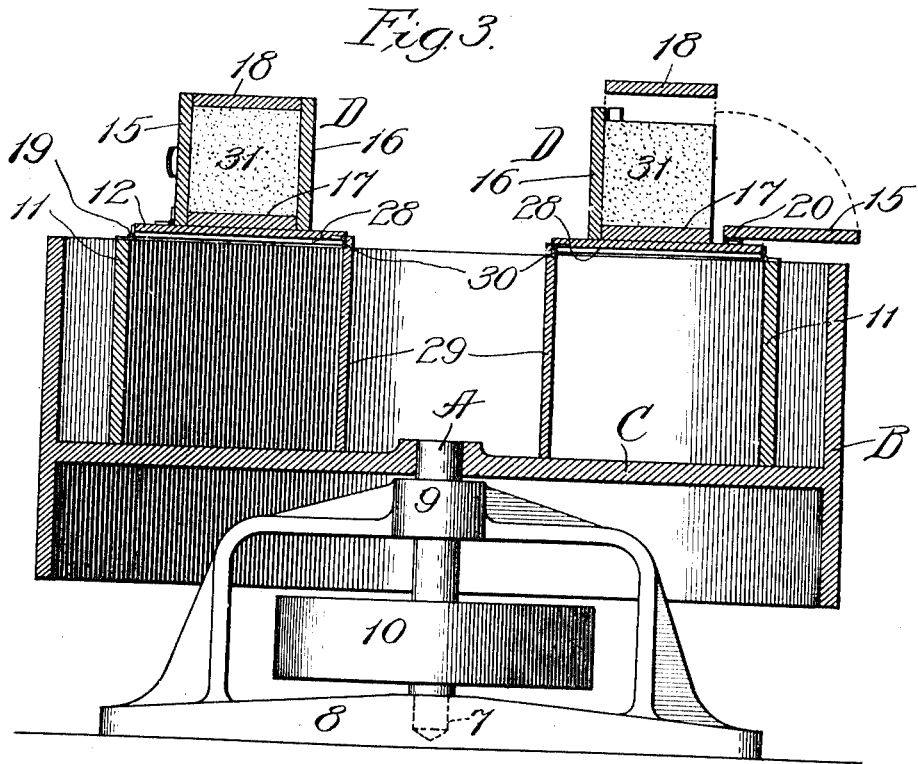
Figure 4:
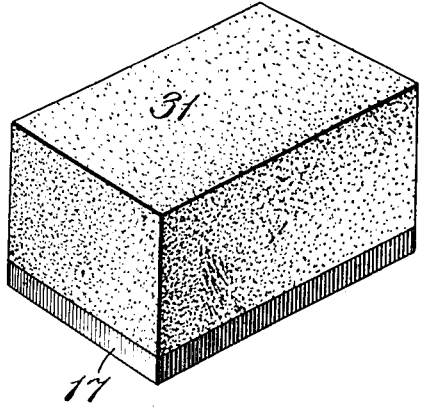

Figure 1 is a plan of a centrifugal molding machine, embodying the improved features. Fig. 2 is a part elevation and part section with a portion of the drum element broken away and showing a mold member in transverse section. Fig. 3 is a vertical transverse section on angle line 3—3, Fig. 1. Fig. 4 is a view in perspective of a concrete block and a pallet on which it rests when removed from the mold. Fig. 5 is a view in perspective of a mold closed and showing a follower-plate in position to be inserted in the open side thereof. Fig. 6 is a plan showing the mold in the opposite position from that of Fig. 5, the mold sections being open.

In the accompanying drawings, there is shown the practical embodiment of a machine for carrying out the method of solidifying a wet mixture by subjecting the same to the action of centrifugal force. The principal elements of this machine comprise a revoluble shaft, a drum B, provided with a web or diaphragm C, and rigidly mounted on said shaft, and a plurality of sectional molds D. There are a number of molds shown and spaced apart in their working position and a detailed description of one will answer for all, the same reference characters being used on each mold as a whole and the companion sectional parts. One end of the shaft A has a step-bearing 7 in a base 8, and is provided with a journal bearing 9 above the driving pulley 10 mounted on the driving-shaft and which may belt with the motive power necessary to transmit the required motion to the machine. The back wall 11 is rigidly secured to the inner circumferential surface of the revoluble drum and the web C. The sectional mold parts comprise a mold back-section 12, the companion end sections 13 and 14, a top-section 15, a bottom 16, a pallet 17 and a follower-plate 18.

The back plate 12 of the mold is connected at its upper edge to the corresponding edge of the wall-plate 11 by hinges 19 and 20, the end sections 13 and 14 have a hinged connection with the bottom section 16, which is rigid with the back 12, by means of hinges 21 and 22; the top 15 is hinged to the mold-back 12 by hinges 23 and 24. Companion spring catches 25 and 26 have one end hinged to the end sections 13 and 14, and when the mold parts are in their closed position the free ends of the catches 25 and 26 will close down over the respective ends of the top section and engage recesses 27, formed therein and retain these parts in their closed relation, as best shown in Figs. 1 and 3.

The mold back section 12 is provided in its outer side with a recess 28 to receive a folding leg 29 when the mold is in the rotatable position shown in Figs. 1 and 2. This leg is hinged at its lower end to the mold back by a hinge 30 and when the mold is swung up into the position shown in Fig. 3, the free end of the leg drops down and rests on the web C of the drum and supports the mold in its changed position for the removal of the molded product.

The pallet 17 is loosely supported in place and is removable from the mold with the concrete block resting thereon. The loose follower-plate 18 is adapted to be inserted in the open side 32 of the mold and is intended to follow that side of the forming block, as the composition is thrown outward in the process of condensing or packing, and keeps the same level and smooth, as the action of centrifugal force has a tendency to dish out the surface of the block on the side opposite to the direction in which the plastic mixture is thrown.

In practical working, the molds are charged with the plastic composition when in the position shown in Fig. 3. The molds are then moved down to the rotating position shown in Figs. 1, 2 and 5. In this position the pallet member 17 rests against the back section 12 of the mold, as best shown in Figs. 2 and 5. When the operation of molding is completed and the motion of the machine arrested, the molds are swung up to the position shown in Fig. 3, which brings the back sections 12 and the pallets into a horizontal position, and the top sections 15 into a vertical position and which is then opened radially and the follower-plate 18 taken out, as shown by the mold at the right hand of Fig. 3. The pallets and the molded blocks resting thereon are then removed from the mold in an axial direction. Duplicate pallets are then inserted in the molds, the same recharged and moved back to their rotatable position, and so on continuously.

To the left in Fig. 3, the mold sections are shown in their closed position ready to be opened out for the removal of the product.

It is obvious that sectional molds may be constructed in many different ways and I therefore do not limit myself to the specific constructions and arrangement shown, but may make alterations and improvements without departing from the spirit of my invention.

It will be understood that the plastic material must be a thoroughly wet mixture in order to secure the best results. The joints of the mold sections will be open sufficiently to permit of a gradual escape of the superfluous liquid element during the operation.

Having thus described my invention, what I claim is:—

1. A centrifugal block-machine having in combination, a rotatable drum, a mold having its back hinged at its upper edge to the upper edge of the drum, and a support carried by said back, whereby the mold may be supported in an elevated position to facilitate the removal of the molded back.

2. A centrifugal block-machine having in combination, a rotatable drum having a fixed inner wall, a mold having its back hinged at its upper edge to the upper edge of the fixed inner wall, and a leg hinged to the lower edge of said back, said leg providing a support for one side of the mold when swung up in elevated position.

3. A centrifugal block-machine having in combination, a rotatable drum having a fixed inner wall, a mold having its back hinged at its upper edge to the upper edge of the fixed wall, so as to permit the mold being swung inwardly, and upwardly, and means for supporting said mold in its raised position.

In testimony whereof I affix my signature in presence of two witnesses.

NATHANIEL P. ANNIS.

Witnesses:
L. B. COUPLAND,
VAIL R. BUCKLIN.